(12) United States Patent
Yang

(10) Patent No.: US 6,955,521 B2
(45) Date of Patent: Oct. 18, 2005

(54) FLOW-FORCED GENERATOR WITH TURBO-CHARGING DEFLECTION HOOD

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 178 days.

(21) Appl. No.: 10/395,125

(22) Filed: Mar. 25, 2003

(65) Prior Publication Data

US 2004/0191053 A1 Sep. 30, 2004

(51) Int. Cl.[7] .................................................. F03D 3/00
(52) U.S. Cl. ...................... 415/4.2; 415/4.4; 415/121.2; 415/204; 415/907; 290/44; 290/55
(58) Field of Search ........................... 415/3.1, 4.2, 4.4, 415/121.2, 204, 205, 907; 290/44, 55

(56) References Cited

U.S. PATENT DOCUMENTS

| | | | | |
|---|---|---|---|---|
| 1,096,057 A | * | 5/1914 | Rees | .......................... 415/4.4 |
| 1,460,114 A | * | 6/1923 | Shelton | ....................... 415/4.2 |
| 1,935,097 A | * | 11/1933 | Nelson | ........................ 415/4.2 |
| 4,031,405 A | * | 6/1977 | Asperger | ...................... 415/4.4 |
| 4,260,325 A | * | 4/1981 | Cymara | ....................... 415/4.4 |
| 5,447,412 A | * | 9/1995 | Lamont | ....................... 415/4.2 |
| 6,239,507 B1 | * | 5/2001 | Douthit | .................. 416/132 B |
| 6,638,005 B2 | * | 10/2003 | Holter et al. | ................. 415/4.2 |

* cited by examiner

Primary Examiner—Edward K. Look
Assistant Examiner—Igor Kershteyn
(74) Attorney, Agent, or Firm—Rabin & Berdo, P.C.

(57) ABSTRACT

A flow-forced generator adapted with a turbo-charging deflection hood having at the peripheral of the vortex ring in the generator provided with an automated directional turbo-charging deflection hood for the air or fluid to produce turbo-charging results due to the reducing deflection of the hood, thus to increase the power of the generator in case of insufficient flow force.

11 Claims, 9 Drawing Sheets

FLOW-FORCED GENERATOR WITH TURBO-CHARGING DEFLECTION HOOD

BACKGROUND OF THE INVENTION (a) Field of the Invention

The present invention is related to a flow-forced generator adapted with a turbo-charging deflection hood, and more particularly, to one having at the peripheral of the vortex ring in the generator provided with an automated directional turbo-charging deflection hood for the air or fluid to produce turbo-charging results due to the reducing deflection of the hood, thus to increase the power of the generator in case of insufficient flow force.

(b) Description of the Prior Art

Whereas the vortex ring does not require directionality, the conventional turbo-driving generator is simple in structure, compact and at lower production cost with a wide range of applications. The turbo structure of most of the flow-forced generators driven by turbo generally available in the market is comprised of multiple are blades in approximately spherical shape. The gas or liquid fluid pushes each of the forced side of those blades, and in turn, each returning side of those blades where smaller resistance is met returns for the turbo-driving generator to revolve and generate power. However, the conventional flow-forced generator driven by turbo is found with the flaw that trade-off takes place between the impetus from the forced side and the resistance from the returning side each of those blades.

SUMMARY OF THE INVENTION

The primary purpose of the present invention is to provide a flow-forced generator adapted with a turbo-charging deflection hood to improve the power of the generator in case of insufficient flow force. To achieve the purpose, an automated directional turbo-charging deflection hood is mounted to the peripheral of the vortex ring in the generator to compress and deflect the fluid, thus to increase positive pressure to the forced side and to increase negative pressure to the returning side of the blades for reducing resistance against the returning side of the blades.

DETAILED DESCRIPTION OF THE PREFERRED EMBODIMENTS

Figure 1:
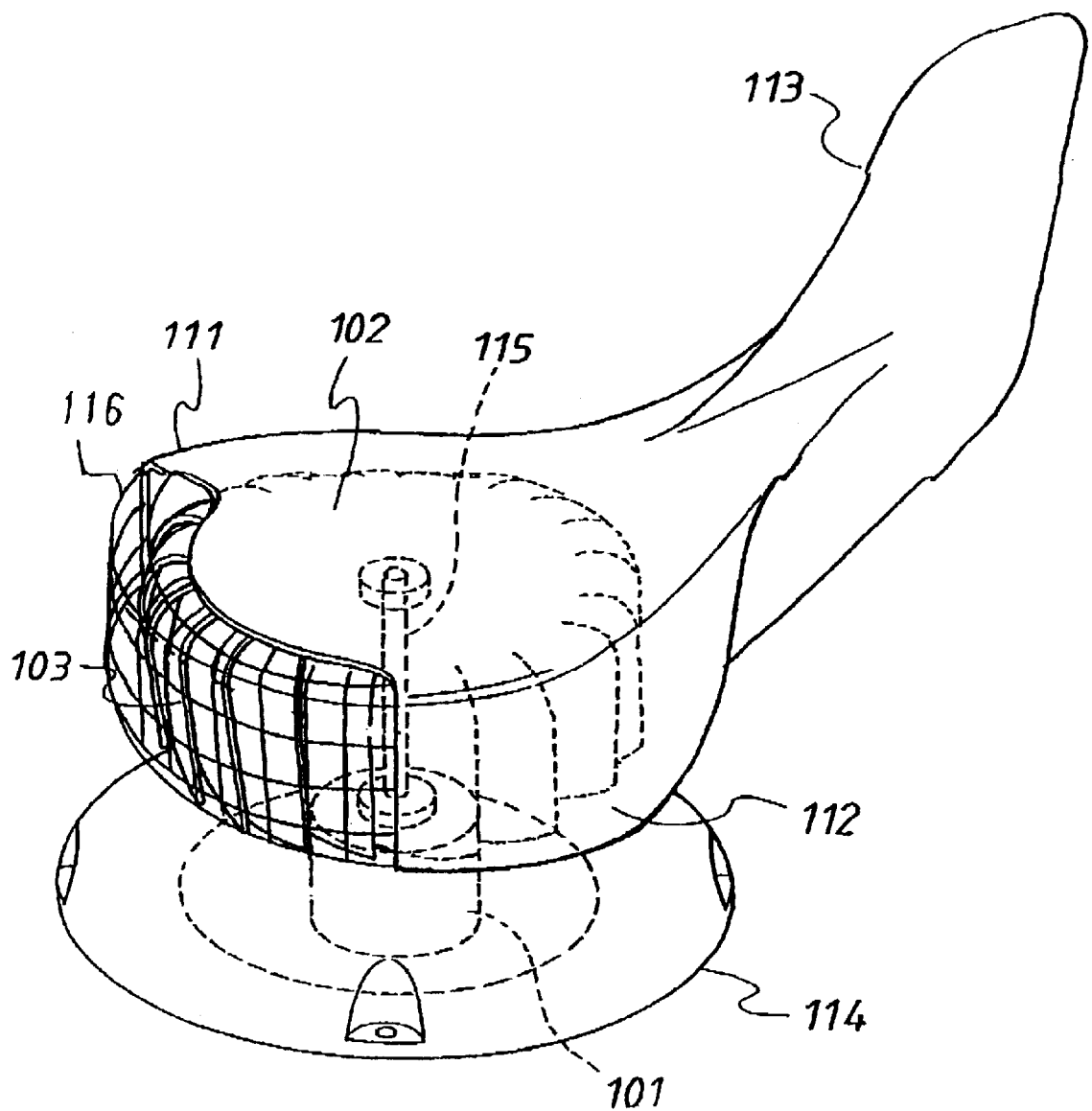
FIG. 1 is a perspective view of a preferred embodiment of the present invention.
Figure 2:
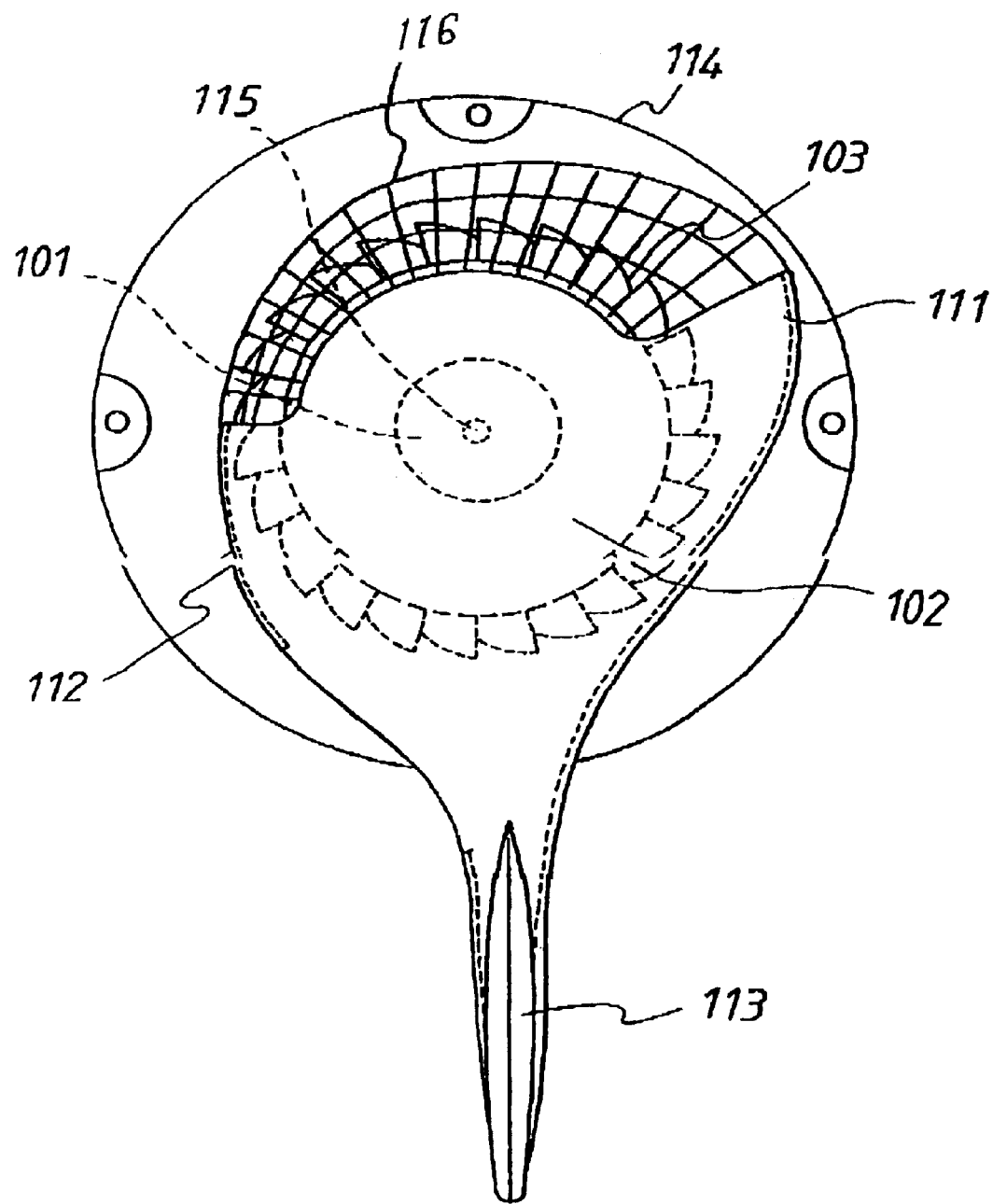
FIG. 2 is a bird's view of the preferred embodiment of the present invention taken from FIG. 1.
Figure 3:
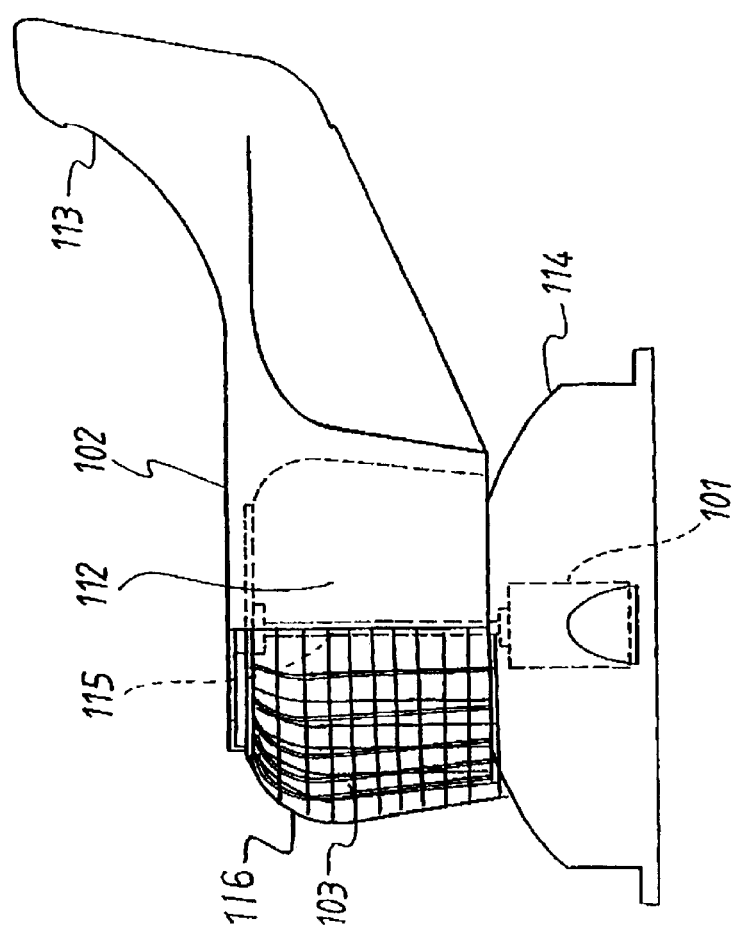
FIG. 3 is a side view of the preferred embodiment of the present invention taken from FIG. 1.

Referring to FIG. 1 for a perspective view; FIG. 2, a bird's view; and FIG. 3, the side view of a preferred embodiment of the present invention. A flow-forced generator adapted with a turbo-charging deflection hood as illustrated in FIGS. 1, 2, and 3 has the turbo-charging deflection hood 102 adapted to a vortex ring in the flow-forced generator. A flow-forced, directional rudder 113 is provided to the hood 102. The hood is mounted to the peripheral of an automated directional vortex ring to propel the flow-forced generator. Wherein, the air or liquid fluid is guided by an arc deflector 111 provided to the hood 102 for increasing the positive pressure to propel the forced side to create the effect of increased positive pressure, thus to increase the impetus to multiple blades of the vortex ring. Meanwhile, another arc deflector 112 is provided to increase the negative pressure, thus to create the effect of increased negative pressure to the returning side of those vortex ring blades for reducing the resistance to the vortex ring revolving in opposite direction; in turn, to improve the driving force of the vortex ring in the flow-forced generator for increasing the generation power in case of insufficient flow force. The flow-forced generator adapted with the turbo-charging deflection hood of the present invention essentially comprised of the vortex ring 103, the turbo-charging deflection hood 102, the generator 101, and other structural members normally provided to the generator including an axial, a casing and a bearing, is further characterized by that:

the turbo-charging deflection hood 102 is provided with the arc deflector 111 to increase the positive pressure, another arc deflector 112 to increase the negative pressure, at least one flow directional rudder 113, and a free revolving circular base 114 adapted to the axial of the vortex ring in a casing structure; the directional rudder is vertically provided to indicate positive direction with that of the fluid and the front end at the bottom of the directional rudder 113 is extended through the casing structure further to the circular base 114, which is then coupled to the vortex ring axial 115; the turbo-charging deflection hood 102 automatically executes directional revolving by following the flowing direction of the fluid; one side or both sides of the casing is respectively provided with the arc deflector, the deflector on one side relates to the arc deflector 111 that meets the fluid to increase the positive pressure; once the fluid flows to the inner side of the arc deflector 111 that increase the positive pressure, the fluid is guided by the reducing structure of the art deflector 111 for increasing the positive pressure, to increase pressure to the fluid, thus to deliver the charged fluid into the forced side of those blades of the vortex ring 103 that is subject to the impetus by the fluid, so to drive the vortex ring 103 to revolve; meanwhile, whose blades of the vortex ring 103 on the returning side with increased negative pressure by the arc deflector 112 is provided for the fluid to create negative pressure between those blades on the returning side of the vortex ring 103 when passing through the arc deflector 112 to reduce resistance acting upon the returning side of those blades of the vortex ring 103;

the vortex ring 103, in approximately spherical shape, having its peripheral comprised of multiple arc blades; a larger front interval followed by a smaller interval are created between each blade and the positive pressure increasing arc deflector 111 to meet the fluid and create the effect of increased positive pressure, thus to increase the impetus applied to the forced side of each blade; meanwhile, the a smaller front internal followed by a larger internal are formed in the direction meeting the fluid between the negative pressure increasing arc deflector 112 and each blade and create the effect of increased negative pressure, resulting in reduced resistance to the returning side of the vortex ring 103 to revolve in opposite direction, thus to facilitate the fluid to propel the revolution of the vortex ring 103 in driving the generator.

Figure 4:
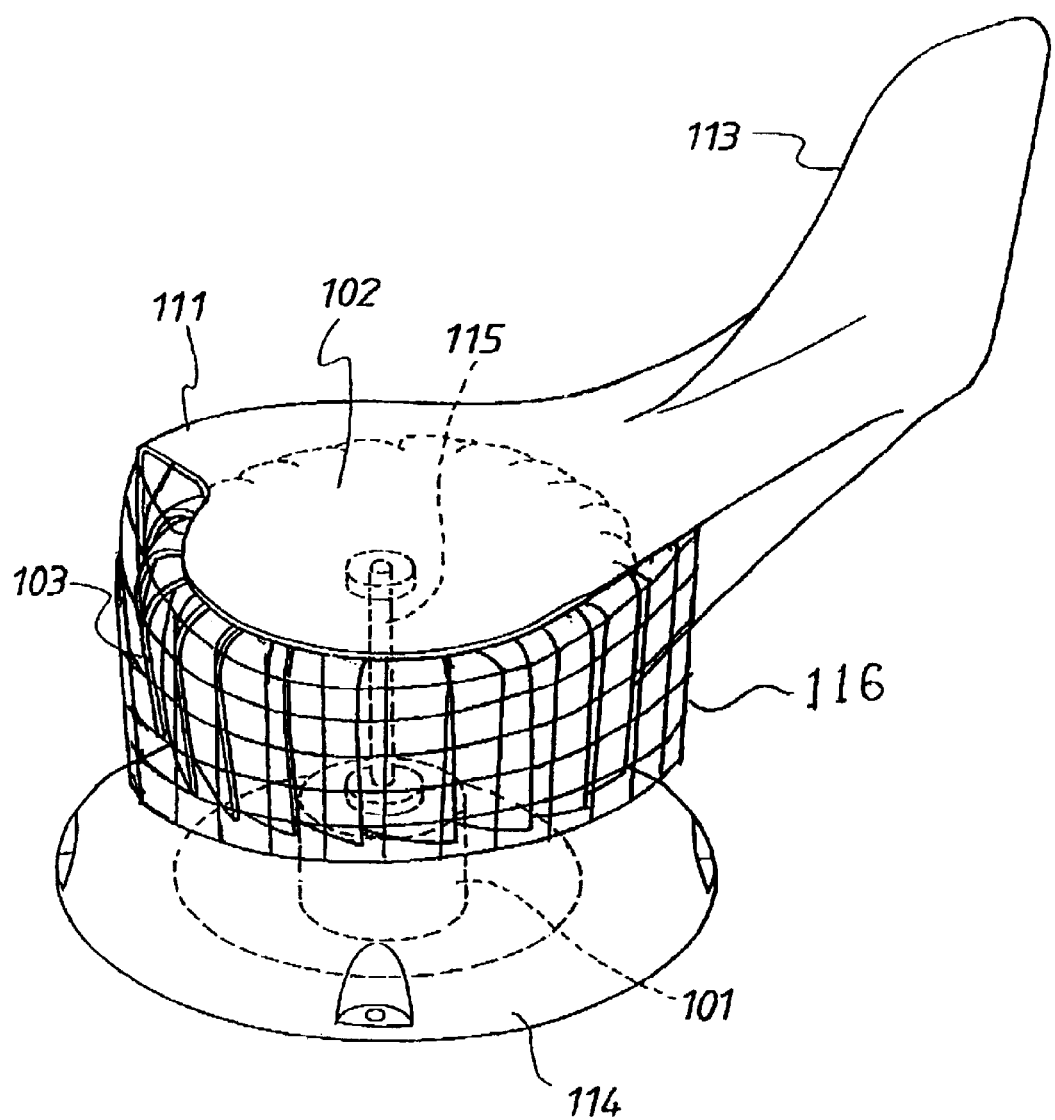
FIG. 4 is a schematic view showing that only an arc deflector for increasing the positive pressure is selected for the preferred embodiment of the present invention.
Figure 5:
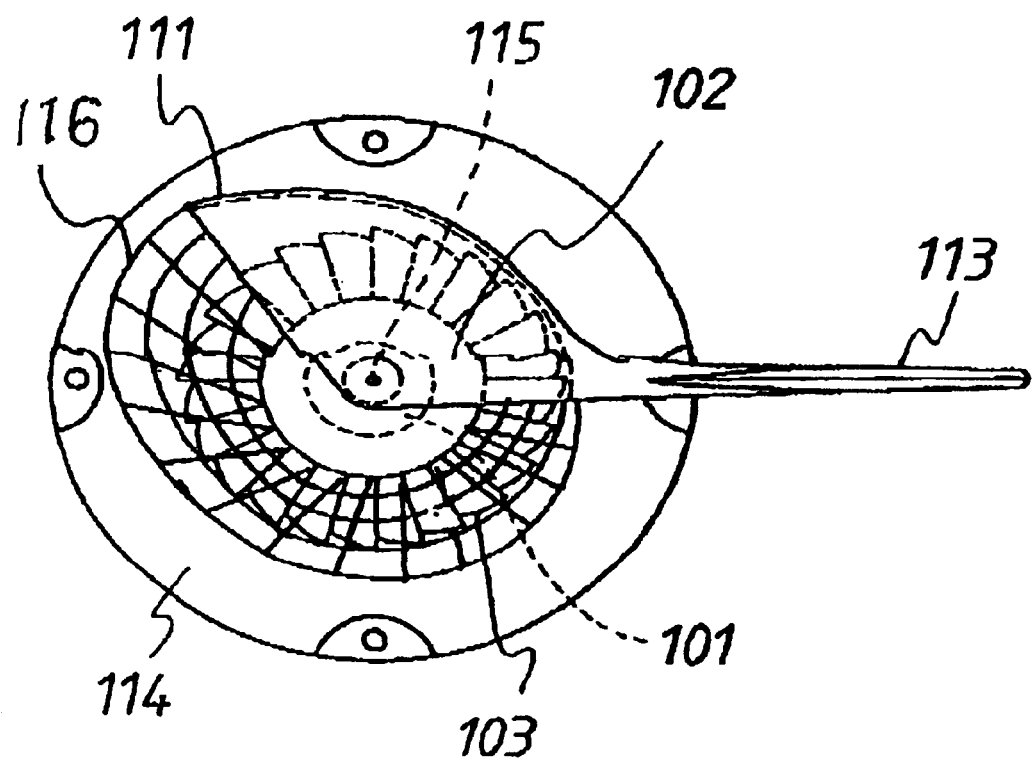
FIG. 5 is a bird's view of the preferred embodiment of the present invention taken from FIG. 4.
Figure 6:
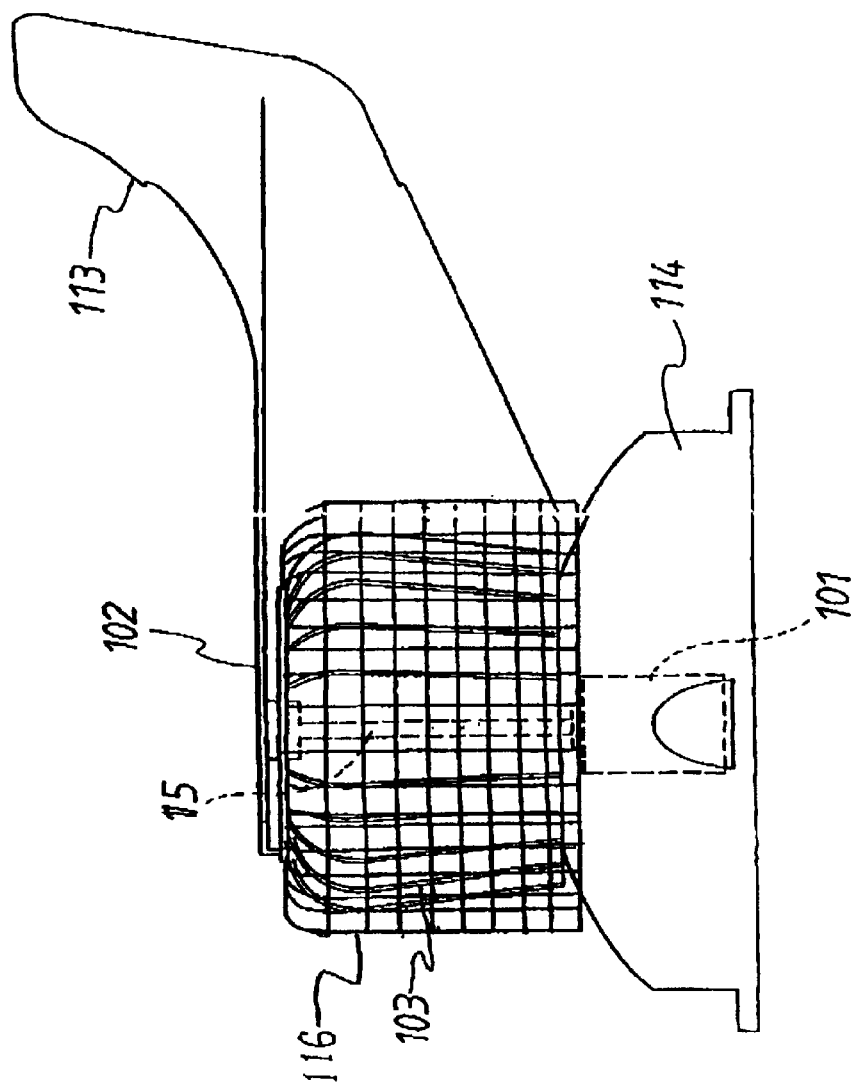
FIG. 6 is a side view of the preferred embodiment of the present invention taken from FIG. 4.

In practice, both of the arc deflector 111 to increase the positive pressure, and another arc deflector 112 to increase the negative pressure can be provided at the same time to the turbo-charging deflection hood adapted to the flow-forced generator of the present invention. Alternatively, as illustrated in FIG. 4 for the perspective view of a preferred embodiment of the present invention, wherein, only the arc deflector 111 is provided as also illustrated in FIG. 5, the bird's view and FIG. 6, the side view of the preferred embodiment. FIGS. 4, 5 and 6 show the structure of the flow-forced generator adapted with the turbo-charging deflection hood is provided with only the arc deflector 111 to increase the positive pressure.

As is best shown in FIG. 2, distances between either of the arc deflectors 111, 112 and the blades at the periphery of vortex ring 103 increase or decrease continuously away from a lip of the deflection hood 102.

Figure 7:
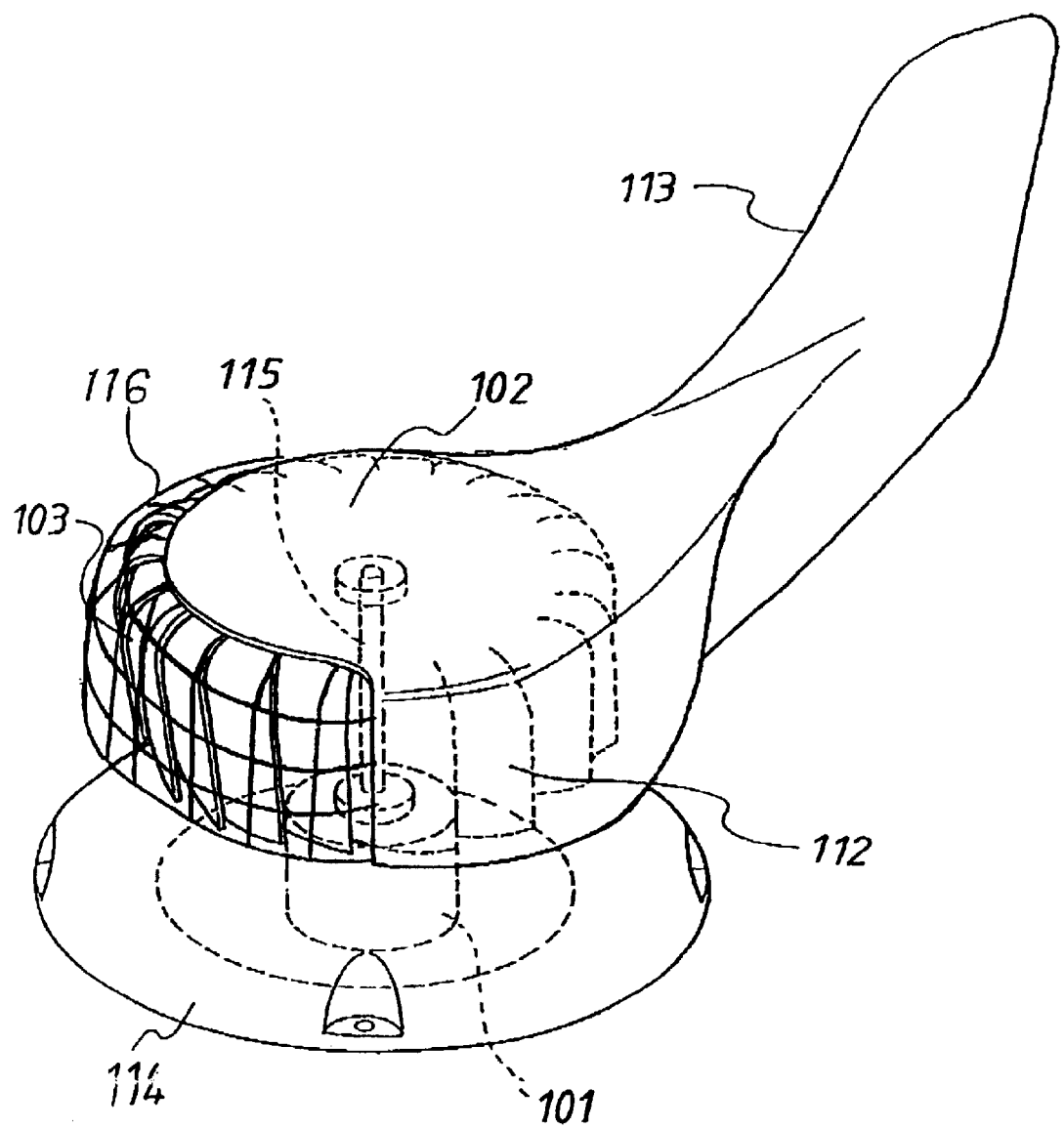
FIG. 7 is a schematic view showing that only an arc deflector for increasing the negative pressure is selected for the preferred embodiment of the present invention.
Figure 8:
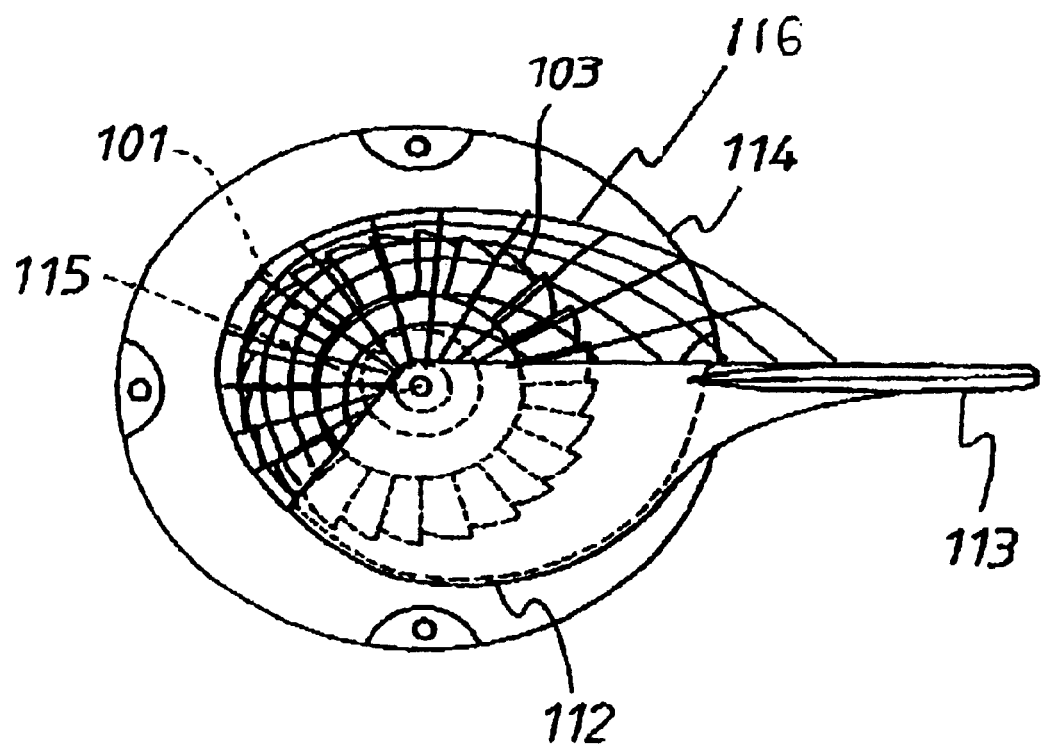
FIG. 8 is a bird's view of the preferred embodiment of the present invention taken from FIG. 7.
Figure 9:
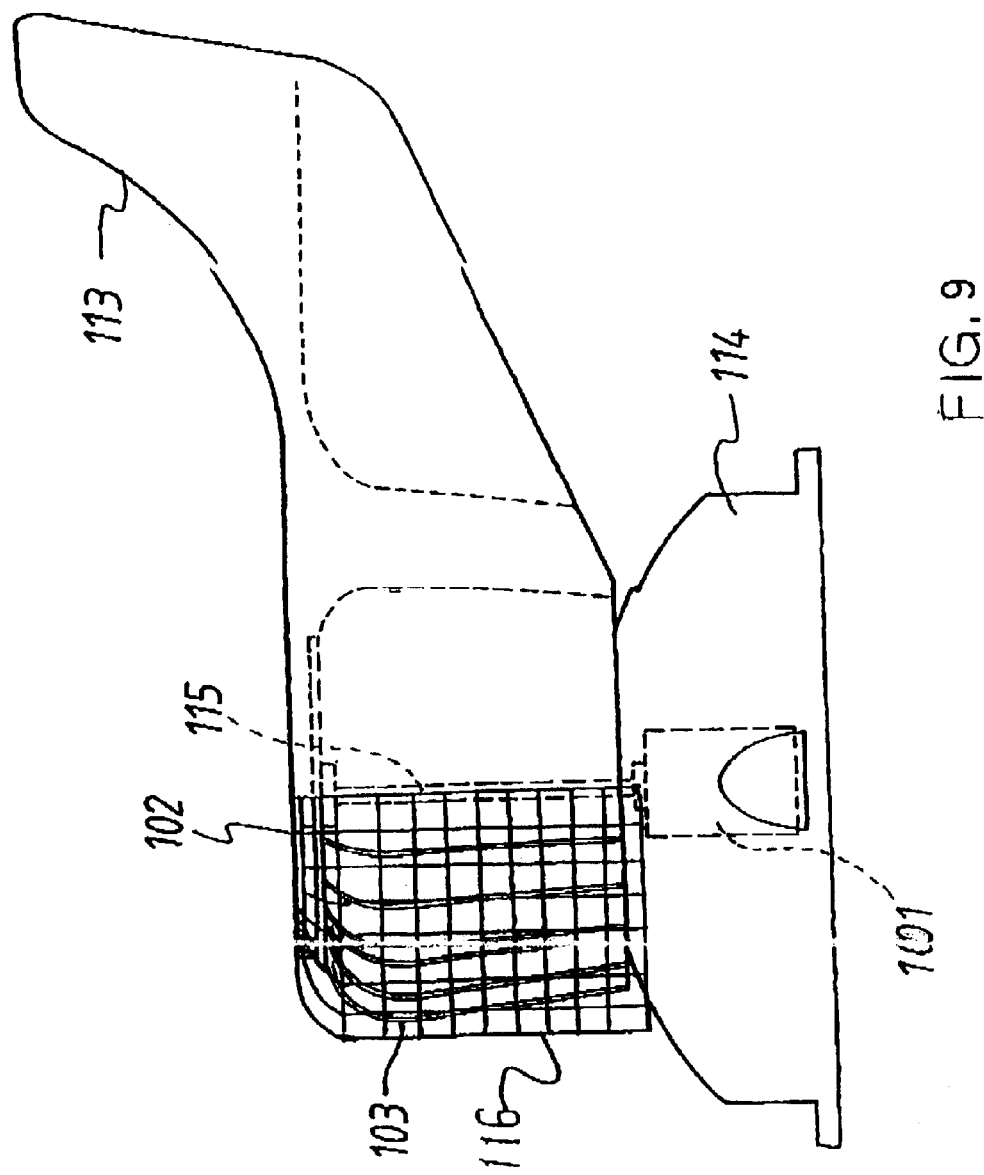
FIG. 9 is a side view of the preferred embodiment of the present invention taken from FIG. 7.

In practice, as illustrated in FIG. 7 for the perspective view of a preferred embodiment of the present invention, wherein, only the arc deflector 112 is provided as also illustrated in FIG. 8, the bird's view and FIG. 9, the side view of the preferred embodiment. FIGS. 7, 8 and 9 show the structure of the flow-forced generator adapted with the turbo-charging deflection hood is provided with only the arc deflector 112 to increase the negative pressure.

A protection mesh 116 is provided as applicable by the inlet of the deflection hood 102 of the flow-forced generator 101 adapted with the turbo-charging deflection hood to prevent foreign matters carried by the fluid from entering into the vortex ring 103.

As disclosed above, a flow-forced generator adapted with a turbo-charging deflection hood of the present invention is innovative, practical and provided with its specific functions; therefore, this application is duly filed accordingly.

What is claimed is:

1. A fluid flow-forced generator unit comprising:
   a generator (101);
   a rotatable, directional vortex ring (103) coupled to the generator and comprising multiple blades, the blades having respective forced sides and returning sides;
   a turbo-charging deflection hood (102), the hood being mounted around a periphery of the vortex ring and including a flow-forced, directional rudder (113), a first arc deflector (111), and a second arc deflector (112),
   the first arc deflector (111) guiding the fluid to increase a positive pressure on the forced sides of the vortex ring blades, to increase the impetus of the fluid on the multiple blades of the vortex ring;
   the second arc deflector (112) guiding the fluid to increase a negative pressure on the returning sides of the vortex ring blades, to reduce resistance to the vortex ring revolving in direction opposite to fluid flow;
   wherein, between the first arc deflector and the blades at a periphery of vortex ring, a larger, front distance is followed by a smaller distance in a direction of blade travel along the periphery; whereby the first arc deflector guides the fluid to deliver the charged fluid into the forced side of the blades of the vortex ring; and
   wherein, between the second arc deflector and the blades at a periphery of vortex ring, a smaller, front distance is followed by a larger distance in a direction of blade travel along the periphery.

2. The generator unit according to claim 1, comprising a protection mesh (116) by the inlet of the deflection hood to prevent foreign matter carried by the fluid from entering into the vortex ring.

3. The generator unit according to claim 1, comprising a generator axle and a bearing, and a free revolving circular base (114) coaxial with the vortex ring in a casing structure;
   wherein the directional rudder is vertically oriented to align with a flowing direction of the fluid; whereby the turbo-charging deflection hood automatically revolves to follow the flowing direction of the fluid; and
   a front end of the bottom of the directional rudder extends through the casing structure to the circular base, which is coupled to the vortex ring axle (115); one side or both sides of the casing comprise the first arc deflector and/or the second arc deflector.

4. The generator unit according to claim 3, comprising a protection mesh (116) by the inlet of the deflection hood to prevent foreign matter carried by the fluid from entering into the vortex ring.

5. The generator unit according to claim 1, wherein distances between either arc deflector and the blades at a periphery of vortex ring increase or decrease continuously away from a lip of the deflection hood.

6. A fluid flow-forced generator unit comprising:
   a generator (101);
   a rotatable, directional vortex ring (103) coupled to the generator and comprising multiple blades, the blades having respective forced sides and returning sides;
   a turbo-charging deflection hood (102), the hood being mounted around a periphery of the vortex ring and including a flow-forced, directional rudder, and an arc deflector (111),
   the arc deflector (111) guiding the fluid to increase a positive pressure on the forced sides of the vortex ring blades, to increase the impetus of the fluid on the multiple blades of the vortex ring,
   wherein, between the arc deflector and the blades at a periphery of vortex ring, a larger, front distance is followed by a smaller distance in a direction of blade travel along the periphery; whereby the arc deflector guides the fluid to deliver the charged fluid into the forced side of the blades of the vortex ring.

7. The generator unit according to claim 6, comprising a protection mesh (116) by the inlet of the deflection hood to prevent foreign matter carried by the fluid from entering into the vortex ring.

8. The generator unit according to claim 6, wherein distances between the arc deflector and the blades at a periphery of vortex ring decrease continuously away from a lip of the deflection hood.

9. A fluid flow-forced generator unit comprising:
   a generator (101);
   a rotatable, directional vortex ring (103) coupled to the generator and comprising multiple blades, the blades having respective forced sides and returning sides;
   a turbo-charging deflection hood (102), the hood being mounted around a periphery of the vortex ring and including a flow-forced, directional rudder (113), and an arc deflector (112), the arc deflector (112) guiding the fluid to increase a negative pressure on the returning sides of the vortex ring blades, to reduce resistance to the vortex ring revolving in direction opposite to fluid flow;

wherein, between the arc deflector and the blades at a periphery of vortex ring, a smaller, front distance is followed by a larger distance in a direction of blade travel along the periphery.

10. The generator unit according to claim 9, comprising a protection mesh (116) by the inlet of the deflection hood to prevent foreign matter carried by the fluid from entering into the vortex ring.

11. The generator unit according to claim 9, wherein distances between the arc deflector and the blades at a periphery of vortex ring increase continuously away from a lip of the deflection hood.

* * * * *